No. 607,741. Patented July 19, 1898.
J. N. GARDNER.
NUT LOCK.
(Application filed Feb. 3, 1898.)

(No Model.)

WITNESSES:
Harry S. Rohrer.
Wallace Gunnin

INVENTOR
Jacob N. Gardner
BY
Holcomb & Keegin
ATTORNEYS

UNITED STATES PATENT OFFICE.

JACOB NETTION GARDNER, OF SAVANNAH, GEORGIA, ASSIGNOR, BY DIRECT AND MESNE ASSIGNMENTS, TO ISIDORE COLLAT AND MOSES S. BYCK, OF SAME PLACE, AND DAVID A. BYCK AND LILLY COLLAT, OF CHATHAM COUNTY, GEORGIA.

NUT-LOCK.

SPECIFICATION forming part of Letters Patent No. 607,741, dated July 19, 1898.

Application filed February 3, 1898. Serial No. 668,915. (No model.)

*To all whom it may concern:*

Be it known that I, JACOB NETTION GARDNER, a citizen of the United States, residing at Savannah, in the county of Chatham and State of Georgia, have invented certain new and useful Improvements in Nut-Locks; and I do hereby declare the following to be a full, clear, and exact description of the invention, such as will enable others skilled in the art to which it appertains to make and use the same.

The nut-locks now most used are of hardened or tempered steel and are not positive in operation. Consequently it occasionally happens that they break, lose elasticity, or for other reasons fail to hold the nut.

The object of this invention is to provide a nut-lock that shall be positive, unchangeable, inexpensive, and convenient and that can be used not only on railway-tracks, but on vehicles, bridges, and machinery of all kinds, portable and stationary. The devices include a non-revoluble washer and a nut-locking plate or disk to be secured to the washer.

Figure 1:
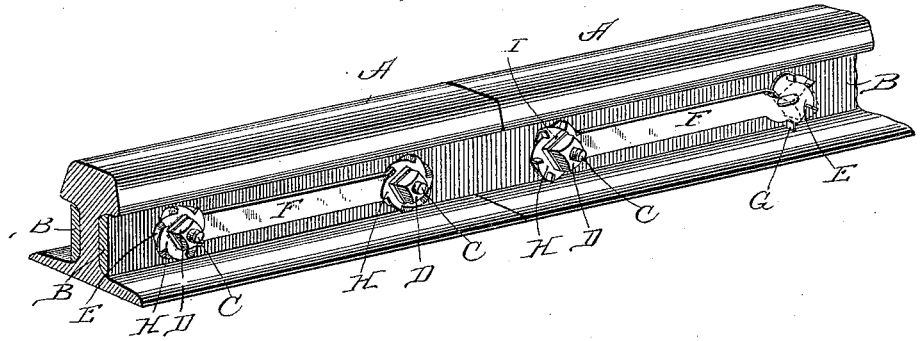
Figure 2:
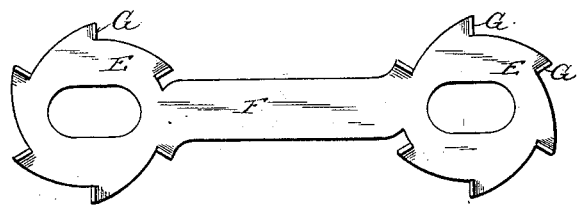
Figure 3:
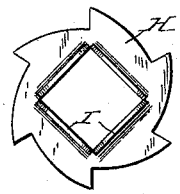
Figure 4:
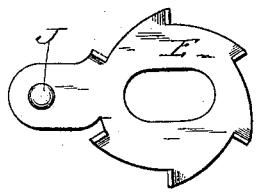
Figure 5:
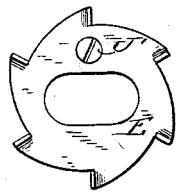
Figure 6:
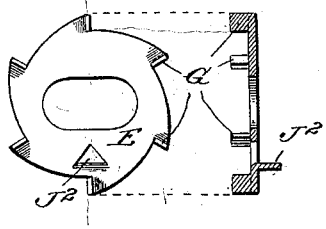

In the drawings, Figure 1 shows a rail-joint in perspective, my devices being in position. Figs. 2 and 3 show, respectively, the washer and the locking-disk detached. Figs. 4, 5, and 6 suggest ways of securing the washer where isolated nuts are locked.

In the figures, A A are the rails, B B the fish-plates, C C the bolts, and D D the nuts, all of any ordinary form.

E E are soft-metal washers connected in pairs for railwork by an integral bar F and having the holes elongated in the usual way. Each has a series of marginal teeth G G struck up a little beyond the path of the nut's angles, as illustrated, not unlike blunted laterally-bent teeth of a common circular saw. Each tooth is in an approximately radial plane perpendicular to the plane of the washer. The fish-plates and bolts being in place, these connected washers are slipped over the proper bolts and the nuts are added and screwed home. The nuts are locked against rotation by plates or disks H H, centrally punched and bent to form openings fitting the nuts, and surrounded by marginal flanges I I, forming a sort of short tube for inclosing the nut. The disks are also marginally notched or recessed to correspond with the washer-teeth, so that each tooth engages the disk and resists its rotation. The teeth are long enough to project beyond the disk and to be bent down upon it. The parts being in proper position some or all of the teeth are bent down upon the disk by a hammer or the like, so that the disk cannot move away from the washer. The nuts are now positively locked and cannot be unscrewed except by force sufficient to simultaneously shear off all the teeth, and as the washers and disks are preferably of soft iron or steel galvanized vibration, contraction, and expansion or other strains incident to use are of no effect and time brings no change. It is, however, quite possible to simultaneously bend all the teeth outward again by the use of a special tool (not shown) whenever it is desired to unlock the nut.

When isolated nuts are to be locked, the washers are not connected, but each is held against rotation by a nail J, a screw J', or a spur $J^2$ engaging the member against which the washer rests and preferably, but not necessarily, in position to be covered by the nut or the disk, as shown in Fig. 6.

What I claim is—

1. The combination with the soft-metal washer having a series of marginal upturned teeth, of means for preventing the rotation of said washer, and the disk provided with the central opening adapting it to fit over a nut and with marginal recesses adapted to receive said teeth respectively, the latter being long enough to project beyond the washer and to be bent down thereon.

2. The combination with the rails, fish-plates, bolts and nuts, of the two integrally-connected washers each provided with upturned marginal teeth beyond the path of the nut, and the locking-disks each having both a central opening adapting it to fit over the nut and the marginal recesses adapted to be engaged by said teeth, respectively.

3. The combination with a pair of bolts and their nuts, of two washers for said nuts integrally connected by the bar and provided with the marginal teeth projecting from the washer in radial planes perpendicular thereto, and the locking-disks each having a marginally-flanged central opening to receive and hold the nut and having its margin notched to engage each of said teeth, the teeth being long enough to project beyond the disk and bend down upon the same, substantially as set forth.

In testimony whereof I affix my signature in presence of two witnesses.

JACOB NETTION GARDNER.

Witnesses:
A. MORRIS,
HARRY COOPER.